United States Patent
Durham

[15] 3,675,974
[45] July 11, 1972

[54] DUAL WHEEL ASSEMBLY AND CLAMP THEREFOR

[72] Inventor: Nolan B. Durham, Miamisburg, Ohio

[73] Assignee: Crowe Manufacturing Company, Dayton, Ohio ; a part interest

[22] Filed: Jan. 22, 1970

[21] Appl. No.: 4,925

[52] U.S. Cl..............................................301/13 SM, 301/20
[51] Int. Cl.............................................................B60b 23/10
[58] Field of Search......................301/12, 13, 13 SM, 18, 19, 301/20

[56] References Cited

UNITED STATES PATENTS

| 3,007,741 | 11/1961 | Brown | 301/13 R |
| 1,816,943 | 8/1931 | White | 301/12 R |
| 3,304,124 | 2/1967 | Brown et al. | 301/12 R |
| 1,946,171 | 2/1934 | Miller | 301/13 SM X |
| 1,790,421 | 1/1931 | Holt | 301/20 |
| 3,142,516 | 7/1964 | Durham | 301/13 SM |

Primary Examiner—Richard J. Johnson
Attorney—Dybvig & Dybvig

[57] ABSTRACT

A wheel assembly suitable for supporting dual tires comprises a wheel having an inboard shoulder against which a rim assembly for the tires can be clamped. The wheel has outboard peripherally spaced spokes each having a rim clamp fastened thereto. The wheel is modified from conventional wheels by reason of extensions formed on the outboard ends of said spokes. The rim clamp is conventional in that it has a leg portion beveled for wedging against an outboard rim shoulder, but is modified from conventional rim clamps by reason of having a second leg sized to seat upon the aforementioned spoke extensions.

3 Claims, 5 Drawing Figures

PATENTED JUL 11 1972 3,675,974

INVENTOR.
NOLAN B. DURHAM
BY
HIS ATTORNEYS

DUAL WHEEL ASSEMBLY AND CLAMP THEREFOR

BACKGROUND OF THE INVENTION

This invention relates to a dual wheel assembly and more particularly to an improved rim clamp construction for use in securing dual rims on a wheel member. The invention is an improvement to the dual wheel assembly illustrated in my U.S. Pat. No. 3,142,516 issued July 28, 1964.

One object of the present invention is to provide a new and improved rim clamp for securing the rims of dual wheel assemblies.

Another object of the present invention is to provide a new and improved spoke design for use in combination with the rim clamp of the present invention.

Other objects and advantages reside in the construction of parts, the combination thereof, the method of manufacture and the mode of operation, as will be more apparent in the following description.

SUMMARY OF THE INVENTION

A vast number of different types of rim clamps and associated dual wheel assemblies can be found in the prior art. Only a few of this vast number have met with commercial success and, insofar as known, none have solved the basic problems to which the present invention is addressed. One basic problem resides in a tendency of the clamp to press the rim into a cocked position such that the axis of the rim is not coaxial to the axis of the wheel and accordingly a tire mounted on the rim does not track uniformly on the roadway. This leads to excessive tire wear. A second related problem is the tendency of the clamp itself to assume a cocked position. When this happens the clamp may be jarred to its uncocked position during use with the result that an inadequate pressure is thereafter applied to the rim assembly. When this happens, the wheel member which supports the rim assembly has a tendency to spin within the rim assembly with the result that an inadequate torque is applied to the tires. This inadequate torque can become manifest both on acceleration and deceleration.

The rim clamp of my aforementioned patent was designed to overcome these basic problems but has thus far proved too expensive and time-consuming in assembly to promote widespread use by the trucking industry. The dual wheel assembly of the present invention has been devised to preserve the basic merit of the structure disclosed in my aforementioned patent and also to eliminate disadvantageous cost features of my patented structure. To reduce raw material costs the rim clamp has been redesigned from a U-shape to an L-shape thus eliminating nearly half the steel required to produce the clamp. The L-shape also simplifies the assembly of the clamp to a wheel spoke and thus reduces the labor costs in assembling the clamps to the dual wheel structure.

The U-shape clamp assured proper alignment of the wheel clamp onto the wheel spoke. To achieve the same assurance with the L-shape clamp structure of the present invention, the wheel spokes have been provided with axial outboard extensions which, as will be later explained in greater detail, cooperate with one leg of the L-shape clamp to assure that the clamp and rim assembly will not be assembled in a cocked position.

DESCRIPTION OF PREFERRED EMBODIMENT

Figure 1:
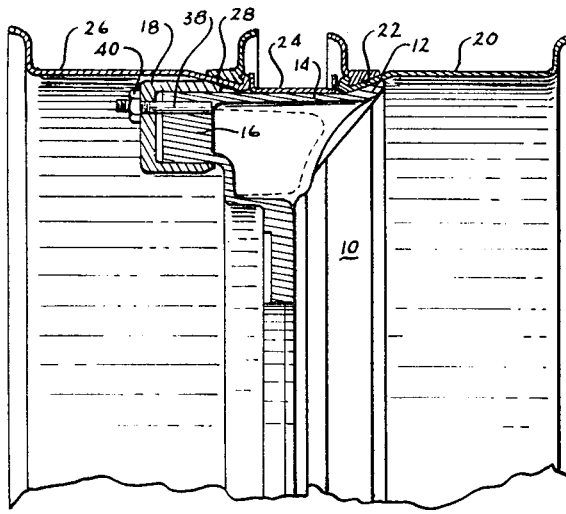
FIG. 1 is a section view with a portion cut away illustrating the dual wheel assembly which is more fully disclosed in my aforementioned patent.

Referring to the drawing in greater detail, reference numeral 10 designates the wheel member of my prior art wheel assembly. This wheel member is characterized by having a conventional radially enlarged shoulder 12 against which the rim assembly is to be aligned. The wheel member 10 is also characterized by an annular or cylindrical surface portion 14 which serves to guide the rim assembly into proper position upon the wheel member.

The wheel member is further characterized by a plurality of axially extending spokes 16. It is conventional in the art to refer to the side of the wheel member 10 at which the shoulder 12 is located as the inboard side of the wheel member. Likewise, it is conventional in the art to refer to the side of the wheel member 10 at which the spoke 16 is located as the outboard side of the wheel member. It has also become conventional in the wheel constructions of the type illustrated in FIG. 1 to employ a total of five peripherally spaced spokes on the outboard side of the wheel member 10. This means of course that five rim clamps are intended to be used in securing an assembly of rims onto the wheel member 10.

The rim assembly of FIG. 1 comprises a first rim 20 adapted to support an inboard tire, a second rim 26 adapted to support an outboard tire, and an annular spacer 24 interposed between the rims 20 and 26 to assure a desired spacing between the inboard and outboard tires.

The inboard rim 20 is equipped with a radially inwardly directed shoulder 22 designed to interfit and snugly abut the wheel shoulder 12. The outboard rim 26 is equipped with a similar radially inwardly directed shoulder 28 which is adapted to interfit a conically shaped surface 32 located on my prior art clamp 18.

Figure 2:
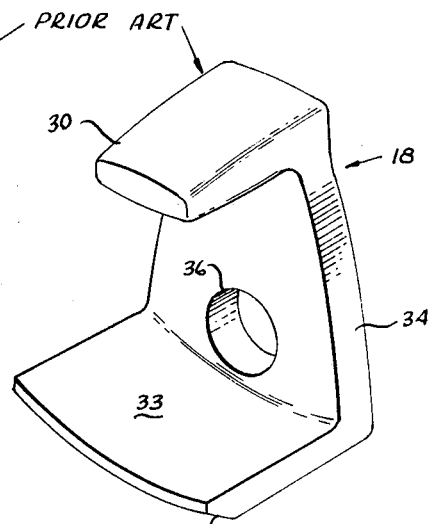
FIG. 2 is an enlarged perspective view of my prior art wheel clamp.

It is evident from an inspection of FIG. 1 that my prior art dual wheel is assembled as follows. The inboard rim 20 is first slid over the wheel member 10 to the inboard position illustrated in FIG. 1. The spokes 16 assist this operation by guiding the rim 20 into concentric relation with the wheel member 10. The spacer 24 is next slid to the position illustrated in FIG. 1 and the outboard rim 26 then guided by the spokes 16 to abutment with the spacer 24. The clamps 18, only one being shown in FIG. 2, are then fitted on the outboard ends of the spokes 16. It will be noted that the clamps 18 have apertures 36 therein which accommodate bolts 38 fixedly embedded in the spokes 16. The dual wheel assembly is completed by turning threaded nuts 40 onto threaded ends of the bolts 38 and in so doing driving the clamps 18 in the inboard direction so as to clamp the rim assembly between the wheel shoulder 12 on the inboard side and the surfaces 32 of the clamps 18 on the outboard side.

It will be noted that the clamp 18 has a cylindrically curved leg 33 and the curvature of this leg is adapted to match the curvature of the upper surface of the spoke 16, as viewed in FIG. 1. Likewise, the clamp 18 has an opposite leg 30 adapted to interfit a cylindrical curved undersurface of the spoke 16, as viewed in FIG. 1. These cylindrically curved surfaces of the clamp 18 are held in fixed spaced relation by the end surface 34 of the clamp 18 which includes the aperture 36. It is the fixed spacing between these cylindrically curved surfaces of the clamp 18 and their interfitting relation to the spokes 16 that assures assembly of the dual wheel of FIG. 1 without encountering the cocked rim condition which has proved so vexatious to the trucking industry.

In this respect it should be noted that nothing prevents spinning of the wheel member 10 within either of the rims 20 or 26 except the pressure that can be developed by the clamps 18 against the outboard shoulder 28 and the resulting pressure developed between the inboard rim shoulder 22 and the wheel shoulder 12. The possibility of a free-spin condition between the wheel member and either or both of the dual rims makes it vitally important that the rim clamps be assembled snugly and without cocking against the rim assembly.

Figure 3:
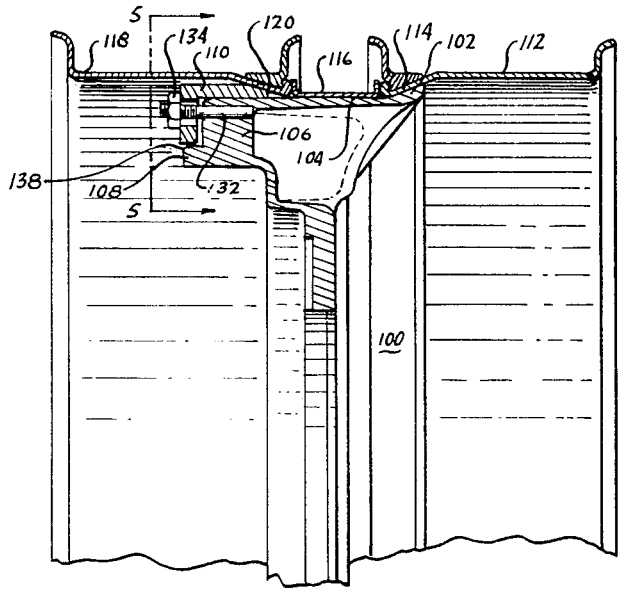
FIG. 3 is a fragmentary sectional view analogous to that of FIG. 1 illustrating the improvement of the present invention.
Figure 4:
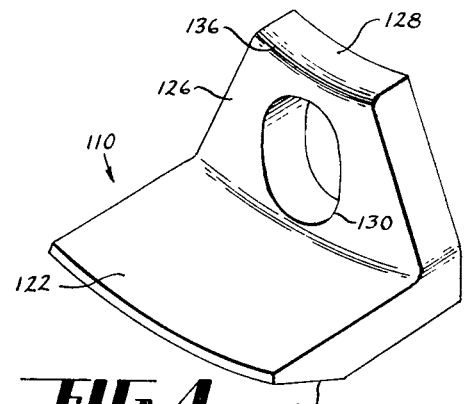
FIG. 4 is an enlarged perspective view of my improved wheel clamp.
Figure 5:
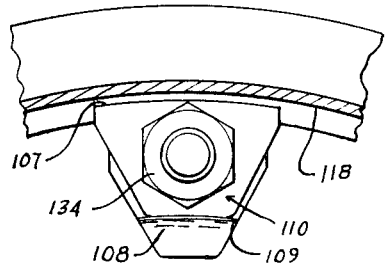
FIG. 5 is a fragmentary and enlarged sectional view taken substantially along the line 5—5 of FIG. 3.

Referring now to my present invention, FIGS. 3, 4 and 5 illustrate the preferred embodiment of this invention.

Reference numeral 100 designates a wheel member which is conventional except in one respect to be later described. The wheel member 100 thus has a conventional radially outwardly projecting inboard shoulder 102, an annular cylindrical guiding surface 104, and peripherally spaced axially extending spokes 106 located to the outboard side of the wheel member 100. As has become the practice in the industry, the spokes 106 are five in number, although only one appears in the drawing.

The spokes 106 differ from those found in conventional wheel members by reason of having axially extending outboard extensions 108 thereon. The extensions 108 have upper surfaces 109 which are cylindrically curved and represent segments of a cylinder of revolution generated about the axis of rotation for the wheel member 100.

Likewise, the spokes 106 have cylindrically curved radially outer surfaces 107 which also represent sections of a cylindrical surface of revolution generated about the axis of rotation for the wheel member 100. For reasons which will later become more apparent, the radius about which the surfaces 107 are generated is larger by a predetermined amount that the radius about which the surfaces 109 are generated.

As with the prior art structure of FIG. 1, the preferred embodiment of the present invention includes an inboard rim 112 having an inwardly directed shoulder 114 which interfits the wheel shoulder 102, and outboard rim 118 having a radially inwardly directed shoulder 120 and a spacer 116 which establishes a predetermined separation between the rims 112 and 118. This rim and spacer construction, being conventional, requires no further description in this application.

The rim clamp for the present invention is designated by the reference numeral 110 in FIG. 3 and is more fully illustrated in FIGS. 4 and 5. This clamp, which is generally of an L-shape in cross-section, comprises a first leg 122, and a second leg 126 disposed substantially at a right angle to the first leg. The interior surface of the leg 122 constitutes a cylindrical section generated about a generating axis substantially perpendicular to the leg 126 and at substantially the same radius as the previously described spoke surfaces 107.

By reason of the manner in which the rim clamp is assembled to the wheel member 100, it is convenient to refer to the end of the leg 122 which most closely approaches the wheel shoulder 102 as the inboard or distal end of the leg 122, and the end of the leg 122 which is integrally connected to the leg 126 as the outboard end of the leg 122.

As best appears in FIG. 4, it can be seen that the inboard end of the leg 122 has a beveled outer surface 124 which represents a segment of a conical surface. The surface 124 is generated about the same axis as the interior surface of the leg 122 and is adapted to snugly interfit the shoulder 120 on the rim 112. The shoulder 120 can be described as comprising a conical interior wall which interfits the surfaces 124 of the several clamps 110.

As also best appears in FIG. 4, the leg 126 of the clamp 110 terminates with an arcuate bearing surface 128. The radius which generates this surface is substantially the same as the radius which generates the surfaces 109 on the spoke extensions 108.

The leg 126 also has an oblong aperture 130 therein which is adapted to accommodate bolts 132 fixedly embedded in each of the spokes 106 and adapted to be threadly engaged by nuts 134. As above noted, the bearing surface 128 is generated about the same axis and at the same radius as the surface 109 of the spoke extension 108 and likewise the interior cylindrical surface of the leg 122 is generated about the same axis and at the same radius as the radially outer surfaces 107 of the spokes 106. It is not to be inferred from this described relationship between the clamp 110 and the spokes 106 however that the separation between the cylindrical interior wall of the leg 122 and the bearing surface 128 is equal to the separation between the surfaces 107 and 109 of the spokes 106. Rather, the length dimension of the leg 126 is sized so that the separation between the bearing surface 128 and the interior cylindrical surface of the leg 122 will slightly exceed the separation between the surfaces 107 and 109 of the spokes 106. This oversize in the leg 126 is preferably only a few thousandths of an inch and is preferably achieved by assigning tolerances to the design of the clamp 110 which assure that the leg 126 will be long enough to locate the bearing surface 128 at least as far from the interior surface of the leg 122 as is the surface 109 from the surface 107 of the spoke 106.

The aperture 130 in the leg 126 is made ovate as shown in FIG. 4 to assure that in all cases within the tolerance limits assigned to the design of the clamp 110 the bearing surface 128 will bottom against and thus bear against the surface 109 of the spoke to which it is assembled. Thus, the bolt 132 is not permitted to interfere with firm seating of the bearing surface 128 against the spoke extension surface 109.

The assembly of the rims 112 and 118 with the spacer 116 onto the wheel member 100 is evident from an inspection of FIG. 3. Likewise, the assembly of the rim clamps 110 to the spokes 106 is evident from an inspection of FIG. 3. Since the leg 126 is oversized as explained, there may be a tendency for the bearing surface 128 to lock against the outer end of the spoke extension 108 as the clamp 110 is slid into position inside the rim 118. The likelihood of any such lock condition is eliminated in the present invention by rounding the inboard margin of the bearing surface 128 as appears at 136 in FIG. 4. For the same reason, the outboard margin of the surface 108 has been rounded as appears at 138 in FIG. 3. Obviously, as these two rounded margins meet, they readily cam one past the other.

It can be further noted in FIG. 3 that the interior cylindrical wall of the rims 118 and 112 is sufficiently large in relation to the cylinder defined by the surfaces 107 of the spokes and in relation to the thickness of the legs 122 of the clamps 110 that ample room exists between the clamps 110 and the interior surface of the rim 118 for camming of the bearing surface 128 onto the spoke extension surface 109.

As the clamps 110 are assembled onto their respective spokes 106 and advanced in the inboard direction by tightening of the nuts 134, the rim 118 is driven into concentric relation to the wheel member 110 by action of the clamp surfaces 124 against the rim shoulder 120. At the same time of course the rim 112 is driven into concentric relation to the rotary axis for the wheel member 100 by reason of the rim shoulder 11 interfitting the wheel shoulder 102. To promote a uniform movement of both rims to concentricity with the axis for the wheel member 100, it is obviously desirable that the nuts 134 be tightened in substantial uniformity as to all spokes 106, this being the common practice in assembling dual wheels of the type disclosed in the present application.

It should be noted that as the surfaces 124 of the clamps 110 are driven progressively in the inboard direction against the rim shoulder 120, the nuts 134 will act against the legs 126 to pivot the clamps 110 inwardly toward the center of the wheel member 100 and thus to press the bearing surfaces 128 progressively harder against the spoke extensions 108. This action assures that the surfaces 124 of the clamps 110 will move snugly under the rim shoulders 120 without a cocking of the clamp 110 and without cocking of the rim 118 from its desired position of concentricity with respect to the rotary axis for the wheel member 100.

It will be noted of course that the legs 122 of the clamps 110 are sized to firmly seat the rims 112 and 118 to their positions of concentricity with respect to the rotary axis for the wheel 100 before the legs 126 can bottom against the outboard ends of the spokes 106.

Having thus described my invention, I claim:

1. A wheel assembly comprising rim means to support at least one tire, a wheel member disposed within said rim means and having inboard and outboard sides, said wheel member having a radially outwardly projecting wheel shoulder adjacent the inboard side thereof, said rim means having a first radially inwardly projecting rim shoulder abutting said wheel shoulder, said wheel shoulder and said first rim shoulder being annular shoulders each having a conical surface interfitting a complementary conical surface of the other, said rim means having a second radially inwardly projecting rim shoulder spaced in the outboard direction from said first rim shoulder, said second rim shoulder being an annular shoulder having a conical wall disposed to the outboard side thereof, said wheel member having a plurality of axially extending spokes at the outboard side thereof, each spoke having a radially outer axial surface, each spoke having an outboard extension projecting axially therefrom, each extension having a radially outer axial seating surface spaced radially inwardly from the outer surface of its spoke, a plurality of rim clamps, each clamp comprising a first leg overlying the outer surface of one of said spokes, each first leg having an inboard end seating against said second rim shoulder and an outboard end, the inboard end of each first leg being a segment of a conical surface adapted to interfit the conical surface of said second rim shoulder, each clamp having a second leg attached to the outboard end of its first leg, each second leg having a bearing surface seating on the seating surface of the extension from the spoke overlaid by the first leg of the same clamp, each second leg having a length causing its bearing surface to bear against the seating surface of the extension from the spoke overlaid by the first leg of the same clamp, and fastener means, there being one fastener means for each clamp, adjustably connecting each second leg to one of said spokes, said fastener means being adjustable to draw said second legs in the inboard direction towards said spokes and thereby bias the inboard end of each first leg against said second shoulder, said outer surfaces of said spokes being sections of a first cylindrical surface of revolution, and said seat-ing surfaces of said extensions being sections of a second cylindrical surface of revolution coaxial to and smaller in diameter than said first surface of revolution.

2. The wheel assembly according to claim 1 wherein the first leg of each said rim clamp has a surface which is a section of a cylindrical surface of revolution substantially equal in diameter to said first surface of revolution, said surface adapted to confront the outer surface of the spoke to which said clamp is connected.

3. The wheel according to claim 2 wherein said bearing surfaces of said second legs are each a section of a cylindrical surface of revolution substantially equal in diameter to said second cylindrical surface of revolution.

* * * * *